US009608837B1

(12) United States Patent
Yun et al.

(10) Patent No.: US 9,608,837 B1
(45) Date of Patent: Mar. 28, 2017

(54) METHOD FOR USING PORTABLE CONTROLLING DEVICE FOR HOME NETWORK

(71) Applicant: Yong Joon Jeon, Seoul (KR)

(72) Inventors: Jeong Ku Yun, Seoul (KR); Beom Seog Kwag, Seoul (KR)

(73) Assignee: Yong Joon Jeon, Seoul (KR)

( * ) Notice: Subject to any disclaimer, the term of this patent is extended or adjusted under 35 U.S.C. 154(b) by 0 days.

(21) Appl. No.: 15/177,354

(22) Filed: Jun. 9, 2016

(30) Foreign Application Priority Data

Sep. 23, 2015 (KR) .................. 10-2015-0134286

(51) Int. Cl.
*H04B 7/00* (2006.01)
*H04L 12/28* (2006.01)
*H04W 4/00* (2009.01)
*H04W 76/02* (2009.01)
*H04W 88/16* (2009.01)
*H04W 84/12* (2009.01)

(52) U.S. Cl.
CPC .......... *H04L 12/282* (2013.01); *H04W 4/008* (2013.01); *H04W 76/02* (2013.01); *H04W 84/12* (2013.01); *H04W 88/16* (2013.01)

(58) Field of Classification Search
CPC ..... H04W 4/008; H04W 76/02; H04W 84/12; H04W 88/16
USPC ........................................................ 455/41.2
See application file for complete search history.

(56) References Cited

U.S. PATENT DOCUMENTS

| 2006/0101498 A1* | 5/2006 | Arling | H04N 21/84 725/81 |
| 2008/0005764 A1* | 1/2008 | Arling | H04H 60/46 725/39 |
| 2009/0327910 A1* | 12/2009 | Black | H04L 12/282 715/744 |

FOREIGN PATENT DOCUMENTS

| KR | 10-2003-0048628 A | 6/2003 |
| KR | 10-2006-0039825 A | 5/2006 |
| KR | 10-2008-0034236 A | 4/2008 |

* cited by examiner

*Primary Examiner* — April G Gonzales
(74) *Attorney, Agent, or Firm* — Revolution IP, PLLC (57) ABSTRACT

Disclosed is a method for using a portable controlling device for a home network, the method including: deactivating the portable controlling device including a first near communications module and a micro-processor in which firmware for a gateway is programmed, by disconnecting electric power supplied from a central unit that is connected to a communications network; activating the portable controlling device by electric power supplied from a first mobile terminal by connecting the portable controlling device to the first mobile terminal; and pairing the portable controlling device with a device for the home network by wireless near communications when the first mobile terminal and the device for the home network are located within a predetermined distance range for performing a pairing process by the wireless near communications.

20 Claims, 4 Drawing Sheets

METHOD FOR USING PORTABLE CONTROLLING DEVICE FOR HOME NETWORK

CROSS-REFERENCE TO RELATED PATENT APPLICATION

This application claims priority to Korean Patent Application No. 10-2015-0134286 filed on Sep. 23, 2015, which is incorporated herein by reference in its entirety.

BACKGROUND

The disclosure relates to a method for using a portable controlling device for a home network, and more particularly, to a method for using a portable controlling device for a home network, whereby pairing between the portable controlling device for the home network and a device for a home network is facilitated.

A home network system, which is a system capable of connecting a personal computer (PC), a peripheral device, a mobile phone, a home appliance, and the like in a house via one network and controlling them, is configured for a user to remotely access into the home network system established in the house via an Internet or telephone line from the outside of the home network system, as well as the inside the home network system and to control all of digital home appliances including a computer, a digital television (TV) set, a digital video player, an air conditioner/heater, and the like, which are connected to the home network system.

Conventional wireless near communications methods used to establish a home network may include Bluetooth, Zigbee, and a wireless local area network (LAN) method.

In the home network system, a home network device (i.e. a digital home appliance) is connected to a gateway so as to be connected to an external (communications) network. In order to connect the home network device to the gateway, it is necessary to pair the home network device with the gateway. While pairing is being performed, the home network device decreases communication signal power to a certain low level for security, i.e. for preventing any gateway in neighbors outside the home network system from being paired with the home network device. Therefore, during the pairing process, the home network device and the target gateway should be located closer than normal locations of those devices, within a certain distance range. However, the conventional gateway needs electric power and is connected to power supply facility in the house to receive the electric power. It is hard to move some home network devices, such as a refrigerator, an air conditioner, a door lock, and built-in home appliances, close to the gateway when pairing them. Thus, in order to pair the gateway with such home network devices which are fixed, big, or located at a long distance even in the house, it is necessary to move the gateway close to such home network devices. In this case, after an additional power supply unit (for example, a battery) is mounted on the gateway, then the gateway is moved close to such home network devices for pairing, and is then re-connected to the power supply facility in the original position of the house.

Like this, it is inconvenient to require complicated connection/separation manipulation operations so as to perform pairing with some home network devices which are fix, big, or located at a long distance even in the house, and the size of the gateway is significantly large such that it is also inconvenient to move the gateway close to the home network devices.

SUMMARY

The disclosure provides a method for using a portable controlling device for a home network, whereby pairing between the portable controlling device for the home network and a device for a home network is facilitated.

According to an embodiment, there is provided a method for using a portable controlling device for a home network, in which the portable controlling device for the home network is coupled to be mechanically connected to a central unit that is connectable to an external communications network, and when the portable controlling device for the home network is mechanically connected to the central unit, the portable controlling device receives power from the central unit and controls a device for a home network using firmware for a gateway and a first near communications module installed in the portable controlling device for the home network, the method including: mechanically connecting the portable controlling device for the home network to a first mobile terminal and activating the portable controlling device for the home network by power supplied from the first mobile terminal; moving the first mobile terminal close to the device for the home network; and performing pairing between the portable controlling device for the home network and the device for the home network.

BRIEF DESCRIPTION OF THE DRAWINGS

The above and other features and advantages of the embodiment will become more apparent by describing in detail exemplary embodiments thereof with reference to the attached drawings in which.

DETAILED DESCRIPTION

FIGS. 1 to 4 illustrate a portable controlling device for a home network according to embodiments and a structure in which pairing between the portable controlling device for the home network and a device for a home network is to be performed.

A portable controlling device 100 for a home network is coupled to be mechanically/physically connected, via a connection interface such as a Universal Serial Bus (USB) interface, to a central unit 10 that may be connectable to an external (communications) network. Devices for the home network, such as a personal computer (PC), a peripheral device, a mobile phone, home appliances, a door lock, and the like in a house may be connected to the central unit 10 via the home network. The central unit 10 may include a networking device, having a communications network module, such as a router and a modem or a computing device which is connected to the networking device. Alternatively, the central unit 10 may include a set-top box which has functionalities of receiving digital contents from the external network and outputting the digital contents to a television set, or may include a wireless access point which allows a Wi-Fi compliant device to connect to the (wired) external network. The central unit 10 solely or in combination with the portable controlling device 100 acts as a gateway for connecting a device for the home network to the external network. However, the central unit 10 may not be limited to the above mentioned devices. When the portable controlling device 100 for the home network is mechanically/physically connected to the central unit 10, power is supplied to the portable controlling device 100 for the home network from the central unit 10. Although it will be described later, because the portable controlling device 100 for the home network includes firmware for a gateway and a near communications module, when the portable controlling device 100 for the home network is mechanically/physically connected to the central unit 10 and is activated by the power supplied from the central unit 10, the portable controlling device 100 for the home network may control a device 300 for a home network using the firmware for a gateway and the near communications module.

Because the central unit 10 includes a communications network module 11 to be connected to the external communications network, the portable controlling device 100 for the home network that is mechanically/physically connected to the central unit 10 may be connected to the external communications network using the communications network module 11 of the central unit 10. Thus, when instructions for controlling the device 300 for the home network that are remotely input by a user are transmitted to the portable controlling device 100 for the home network via the external communications network, the portable controlling device 100 for the home network transmits the instructions to the device 300 for the home network. Because the portable controlling device 100 for the home network is mechanically/physically connected to the central unit 10 and receives power from the central unit 10, pairing between the portable controlling device 100 for the home network and the device 300 for the home network located at a short distance from the central unit (not shown) may be performed through the near communications module.

However, when the device 300 for the home network which needs to be newly paired to the central unit is not located at a short distance from the central unit 10, the device 300 may not be newly paired with the central unit 10 via a pairing process performed by the near communications module. This is because two devices need to be located within a short distance which can be covered by wireless near communications for security reasons, when pairing with each other. In this case, the portable controlling device 100 is separated from the central unit 10 and mechanically/physically connected to a first mobile terminal 200 that will be described later. Then, the portable controlling device 100 is activated by power supplied from the first mobile terminal 200. After the first mobile terminal 200 is moved close to the device 300 for the home network, pairing between the portable controlling device 100 for the home network and the device 300 which needs to be newly paired may be performed through the near communications module of the portable controlling device 100. Then, the device 300 for the home network is paired with the portable controlling device 100 by the wireless near communications. Once the device 300 for the home network is paired with the portable controlling device 100 by the wireless near communications, the device 300 for the home network may be controlled by the portable controlling device 100 connected by the first mobile terminal 200 or by the first mobile terminal 200 through the portable controlling device 100.

The portable controlling device 100 may be disconnected from the first mobile terminal 200 and then mechanically/physically re-connected to the central unit 10, after the device 300 for the home network is paired with the portable controlling device 100 by the wireless near communications. Once the portable controlling device 100 is re-connected to the central unit 10 after the device 300 is paired with the portable controlling device 100, the device 300 and the portable controlling device 100 or other device to which the portable controlling device 100 is mechanically/physically connected may communicate with each other via other wireless communications method which covers longer and wider range than the close range covered during the pairing process. In this way, the user may remotely control the device 300 through the central unit 10 and/or the portable controlling device 10.

Figure 1:
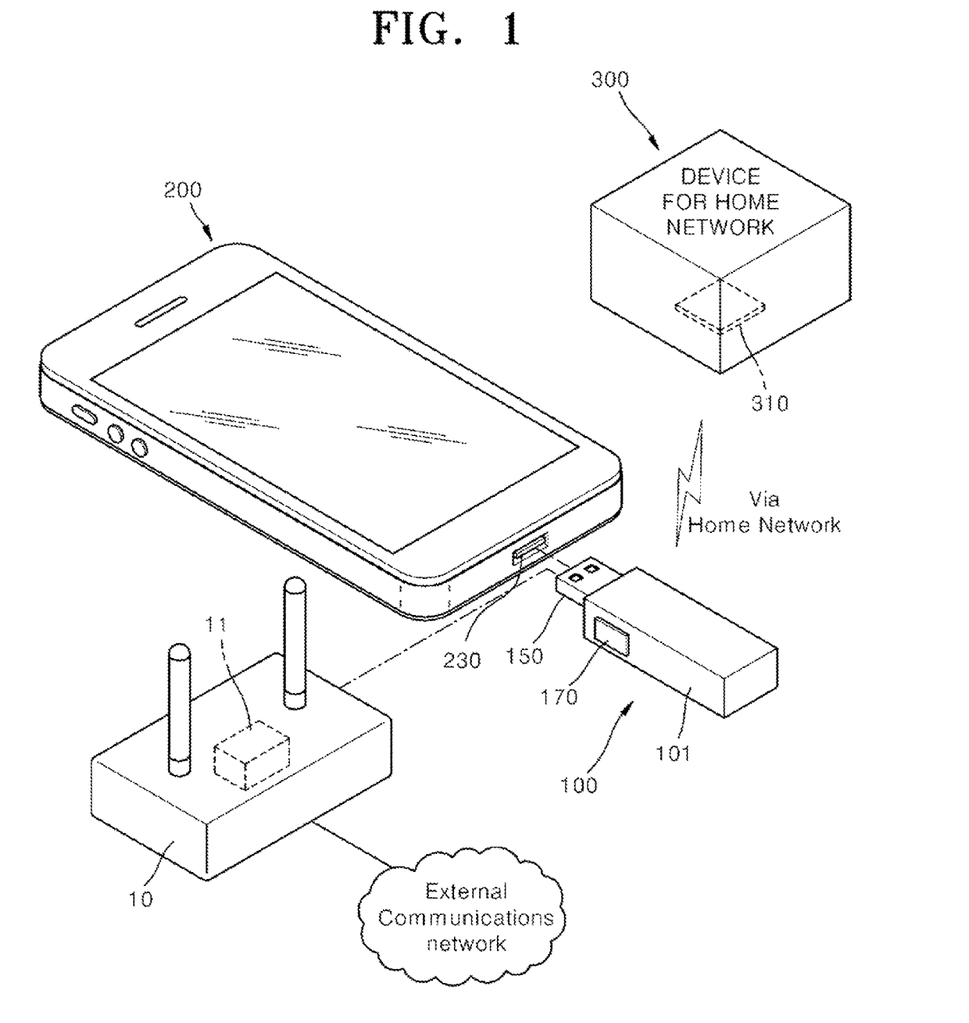
FIG. 1 is a diagram illustrating an exemplary configuration of a home network system to which a method for using a portable controlling device for a home network according to a first embodiment is applied.
Figure 2:
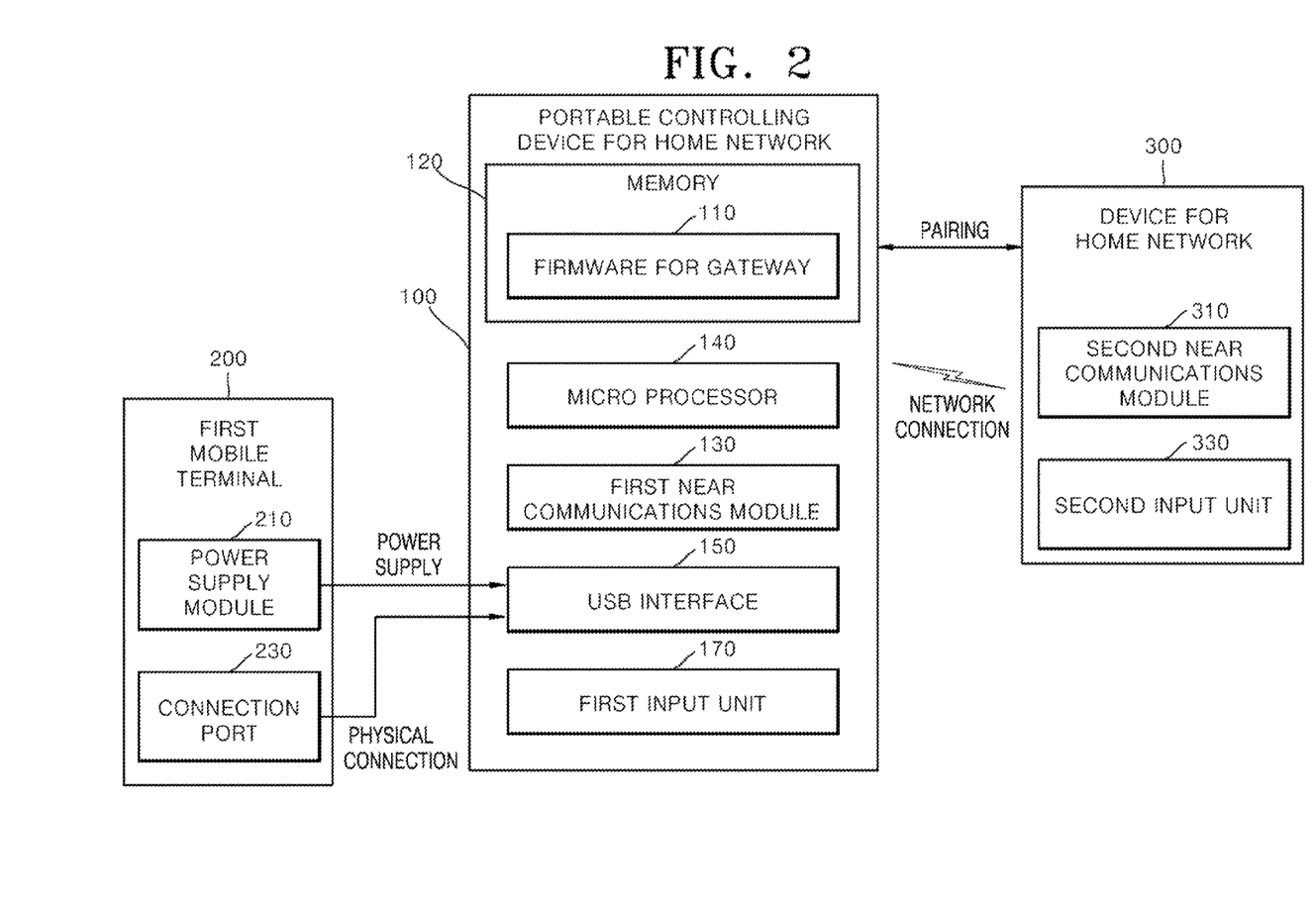
FIG. 2 is a block diagram illustrating an exemplary configuration of the home network system using the portable controlling device for the home network illustrated in FIG. 1.

Hereinafter, the portable controlling device 100 for the home network according to a first embodiment, a configuration for performing pairing the portable controlling device 100 for the home network between the device 300 for the home network, and a pairing structure thereof will be described with reference to FIG. 1.

First, the portable controlling device 100 for the home network includes a main body 101. The main body 101 may be formed to have various shapes. In one example, the main body 101 may be formed to have a shape of a housing having a space in which a memory 120 containing firmware 110, a first near communications module 130, and a micro-processor 140 to execute the firmware 110 may be provided. The firmware 110 programmed in the memory 120 enables the portable controlling device 100 to function as a gateway which links a plurality of devices 300 for the home network with an external network via the central unit 10. The memory 120 may be a separate component physically separated from the micro-processor 140, or be a component physically integrated with the micro-processor 140 but logically divided from the micro-processor 140. The main body 101 includes a universal serial bus (USB) interface 150 connected to the first mobile terminal 200. In more detail, a part of the USB interface 150 may be disposed inside the main body 101, and the other part of the USB interface 150 may protrude toward the outside of the main body 101.

The first near communications module 130 is provided in such a way that, when the portable controlling device 100 for the home network is disposed within a range of a predetermined distance from the device 300 for the home network for successfully performing a pairing process, pairing between the portable controlling device 100 for the home network and the device 300 for the home network may be performed, while the portable controlling device 100 is connected to the central unit 10. For example, Z-wave, Bluetooth, radio frequency identification (RFID), near field communication (NFC), or the like is used as the first near communications module 130.

In the first embodiment, the portable controlling device 100 for the home network may include a first input unit 170. The first input unit 170 may be used for a user to input pairing approval instructions of the first near communications module 130. The first input unit 170 may be applied in various shapes. However, in the first embodiment, the first input unit 170 having a push button shape is applied to the main body 101.

That is, when the user presses the push button 170 (the first input unit) provided at the main body 101, the pairing approval instructions of the first near communications module 130 are input to the portable controlling device 100 for the home network such that pairing between the portable controlling device 100 for the home network and the device 300 for the home network is performed, and the device 300 for the home network is connected to the external communications network through the firmware 110 for the gateway of the portable controlling device 100 for the home network.

When the portable controlling device 100 for the home network is not disposed within the range of the predetermined distance from the device 300 for the home network for successfully performing the pairing process, the first mobile terminal may be used for successfully performing the pairing process. In this case, the portable controlling device 100 is disconnected from the central unit 10 and then mechanically/physically connected to the first mobile terminal 200. Then, the portable controlling device 100 is activated by power supplied from the first mobile terminal 200, so it is possible to successfully perform the pairing process once the first mobile terminal 200 and the portable controlling device 100 together are moved within the range of the predetermined distance from the device 300. Further, determining whether the portable controlling device 100 is within the range of the predetermined distance from the device 300 may be performed in responsive to the device 300 receiving an indication for initiating a pairing process, or in responsive to a signal of the portable controlling device being connected to the first mobile terminal. The first mobile terminal 200 may be a smart phone or smart pad, for example. However, the first mobile terminal 200 is not limited thereto. In the first embodiment, an example in which the first mobile terminal 200 is a smart phone will be described.

A power supply module 210 for supplying power so that the first mobile terminal 200 may be driven, is mounted on the first mobile terminal 200. When the portable controlling device 100 for the home network is mechanically/physically connected to the first mobile terminal 200, power is supplied to the portable controlling device 100 for the home network from the power supply module 210. For example, a battery is used as the power supply module 210.

Also, the first mobile terminal 200 includes a connection port 230 through which the portable controlling device 100 for the home network is mechanically/physically connected to the first mobile terminal 200. In more detail, the USB interface 150 of the portable controlling device 100 for the home network is inserted into the connection port 230 such that the portable controlling device 100 for the home network and the first mobile terminal 200 are mechanically connected to each other. The portable controlling device 100 for the home network receives power of the power supply module 210 via the USB interface 150.

The device 300 for the home network is paired with the portable controlling device 100 for the home network by the pairing process on the first mobile terminal 200 moves close to the device 300, as described above. When the device 300 for the home network is paired with the portable controlling device 100 for the home network, the device 300 for the home network may receive instructions for controlling the device 300 for the home network from the outside of the home network through the firmware 110 for the gateway.

In this way, the device 300 for the home network may include a second near communications module 310 to be paired with the portable controlling device 100 for the home network. Bluetooth, RFID, NFC, or the like is used as the second near communications module 310, like in the first near communications module 130.

The device 300 for the home network is not limited to one type, and various types of digital home appliances that may be remotely controlled by the portable controlling device 100 for the home network from the outside, may be used as the device 300 for the home network. For example, a home electronic product (a refrigerator, an air conditioner, a television (TV), or the like), a door lock, a gas safety device, or the like may be used as the device 300 for the home network.

In addition, the device 300 for the home network also includes a second input unit 330 through which pairing approval instructions of the device 300 for the home network are input, like in the portable controlling device 100 for the home network. The second input unit 330 having a push button shape is used, like in the first input unit 370. When the user inputs instructions for approving pairing by pressing the second input unit 330 of the device 300 for the home network, the second near communications module 330 is communication-connected to the first near communications module 110 such that pairing between the device 300 for the home network and the portable controlling device 100 for the home network is performed.

In an alternative, the second input unit 330 of the device 300 may be used for giving an indication of initiating pairing the device 300 and the portable controlling device 100. In this case, when the second input unit 330 of the device 300 is pushed, the device 300 sends a signal for pairing. The portable controlling device 100 detects the signal for pairing sent from the device 300, and/or at the same time determines that the device 300 waiting for pairing is located within a predetermined distance from the portable controlling device 100. In response to such detection of the signal for pairing from the device 300 or such determination of a nearby location of the device 300, the portable controlling device 100 and the device 300 may interactively perform a pairing process. At a time point after initiating pairing, the second input unit 330 of the device 300 and/or the first input unit 170 of the portable controlling device 100 may be pushed again, for finally approving the paring between the portable controlling device 100 and the device 300.

A structure in which pairing between the portable controlling device 100 for the home network described above and the device 300 for the home network is to be performed through the first mobile terminal 200, will be described as follows. First, the portable controlling device 100 for the home network mechanically/physically connected to the central unit 10 is separated from the central unit 10 and then connected to the first mobile terminal 200.

More specifically, the USB interface 150 of the portable controlling device 100 for the home network is connected to the connection port 230 of the first mobile terminal 200. When the portable controlling device 100 for the home network is connected to the first mobile terminal 200, the portable controlling device 100 for the home network is activated by power supplied from the power supply module 210 provided at the first mobile terminal 200.

Because the portable controlling device 100 for the home network receives power from the first mobile terminal 200, the portable controlling device 100 for the home network may be moved close to the device 300 for the home network, and pairing between the portable controlling device 100 for the home network and the device 300 for the home network may be performed. In order to perform pairing between the portable controlling device 100 for the home network and the device 300 for the home network, instructions for approving pairing are input through each of the first input unit 170 provided at the portable controlling device 100 for the home network and the second input unit 330 provided at the device 300 for the home network. When the instructions for approving pairing are input, the first near communications module 110 provided at the portable controlling device 100 for the home network and the second near communications module 310 provided at the device 300 for the home network are communication-connected to each other so that pairing between the portable controlling device 100 for the home network and the device 300 for the home network is completed.

In the first embodiment, the instructions for approving pairing have to be input through each of the first input unit 170 and the second input unit 330 so that pairing between the portable controlling device 100 for the home network and the device 300 for the home network is performed. However, the first input unit 170 provided at the portable controlling device 100 for the home network may also be omitted.

More specifically, when the portable controlling device 100 for the home network is connected to the first mobile terminal 300 and power is supplied to the portable controlling device 100 for the home network, the portable controlling device 100 for the home network is activated and is in a state in which pairing may be performed. Thus, the portable controlling device 100 for the home network is only moved close to the device 300 for the home network without additionally inputting instructions for approving pairing to the portable controlling device 100 for the home network and the device 300 for the home network, respectively, such that the first near communications module 110 and the second near communications module 310 are communication-connected to each other and the portable controlling device 100 for the home network is paired with the device 300 for the home network. However, in this case, instructions for approving pairing have to be input to the device 300 for the home network through the second input unit 330.

Once the device for the home network is paired with the portable controlling device 100 by the wireless near communications such as Bluetooth, RFID, NFC, or the like, the portable controlling device 100 may be disconnected from the first mobile terminal 200 and then mechanically/physically re-connected to the central unit 10. Once the portable controlling device 100 is re-connected to the central unit 10, a wireless connection between the central unit 10 and the device 300 may be established based on the information generated from the pairing of the portable controlling device 100 and the device 300. The wireless connection between the central unit 10 and the device 300 may be stronger than the pairing of the portable controlling device 100 and the device 300. Once the wireless connection is established, the user may remotely control the device 300 through the central unit 10 and/or the portable controlling device 10.

Figure 3:
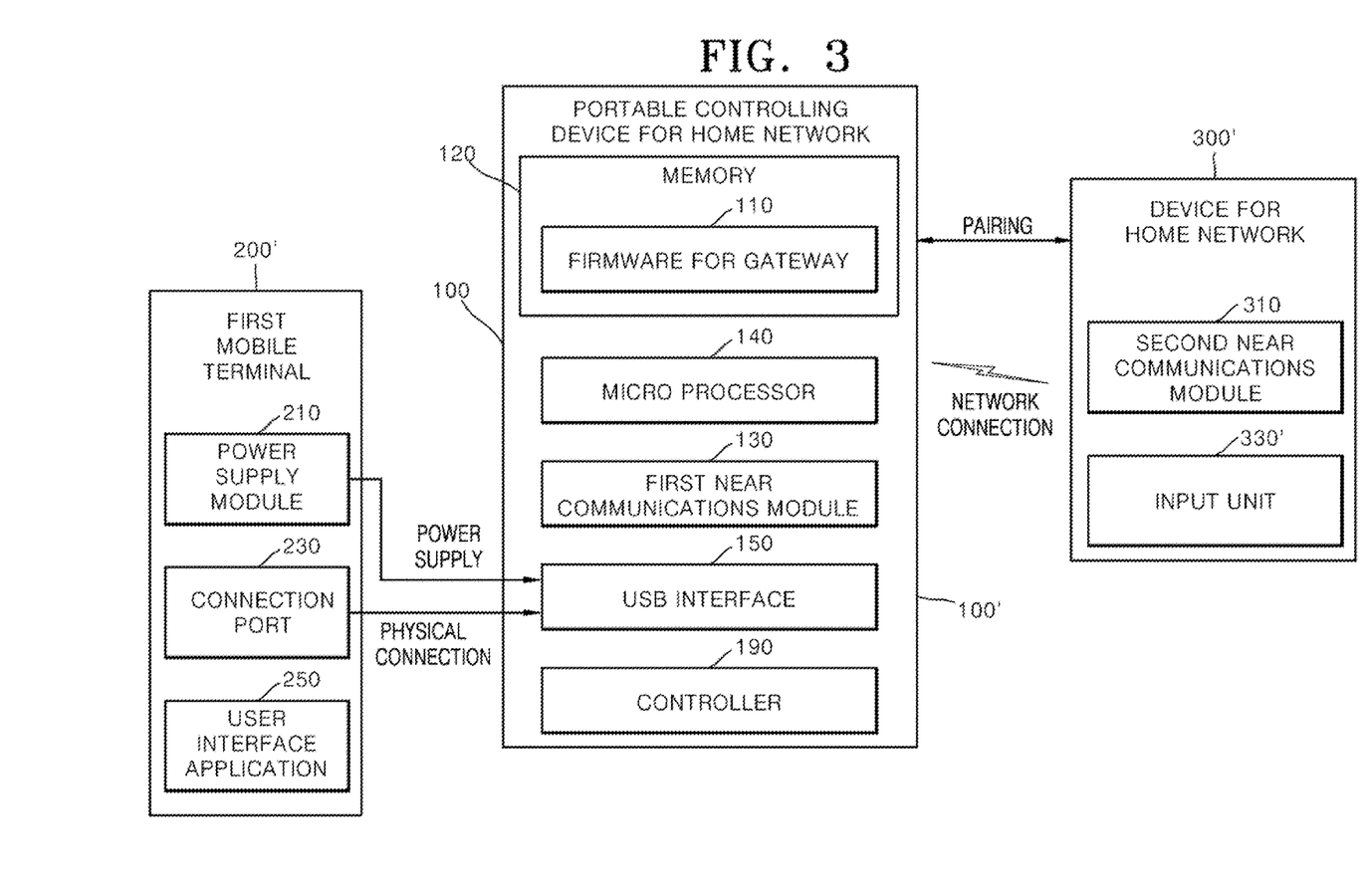
FIG. 3 is a block diagram illustrating an exemplary configuration of a home network system to which a method for using a portable controlling device for a home network according to a second embodiment is applied.

FIG. 3 illustrates a portable controlling device for a home network according to a second embodiment and a structure in which pairing between the portable controlling device for the home network and a device for a home network is to be performed. Same reference numerals are used for the same configuration as that of the first embodiment described above, and detailed descriptions thereof will be omitted.

A first mobile terminal 200' further includes a user interface application 250, unlike in the first mobile terminal 200 according to the first embodiment. The user interface application 250 is installed in such a way that the user controls an operation of a portable controlling device 100' for a home network using the first mobile terminal 200'. The user interface application 250 may be provided by a provider of the portable controlling device 100' for the home network or may also be installed by the user at the first mobile terminal 200' through an application market.

The user interface application 250 executed by the first mobile terminal 200' inputs instructions for approving pairing between the portable controlling device 100' for the home network and a device 300' for the home network. That is, the portable controlling device 100' for the home network is paired with the device 300' for the home network only when the user inputs the instructions for approving pairing using the user interface application 250 installed at the first mobile terminal 200'. Optionally, the user interface application for controlling the device 300' may be shown on a display of the first mobile terminal 200' in responsive to a signal of the portable controlling device 100' being connected the first mobile terminal 200'.

Because the instructions for approving pairing of the portable controlling device 100' for the home network are transmitted from the first mobile terminal 200', a first input unit in the first embodiment is omitted from the portable controlling device 100' for the home network. The portable controlling device 100' for the home network further includes a controller 190 instead of the first input unit omitted, as described above. When the user inputs the instructions for approving pairing by executing the user interface application 250 using the first mobile terminal 200', the controller 190 receives the instructions from the first mobile terminal 200' and delivers the instructions to the first near communications module 250.

An operation in which the portable controlling device 100' for the home network is connected to the device 300' for the home network, will be described as below. First, the portable controlling device 100' for the home network separated from the central unit 10 is connected to the first mobile terminal 200'. Connection of the portable controlling device 100' for the home network and the first mobile terminal 200' is performed by inserting the USB interface 150 of the portable controlling device 100' for the home network into the connection port 230 of the first mobile terminal 200' and connecting the USB interface 150 to the connection port 230 of the first mobile terminal 200'.

When the portable controlling device 100' for the home network is connected to the first mobile terminal 200', the portable controlling device 100' for the home network receives power from the power supply module 210 of the first mobile terminal 200'. When the portable controlling device 100' for the home network to which power is supplied, is activated, the user executes the user interface application 250 installed at the first mobile terminal 100'. The user interface application 250 may be directly executed by the user using the first mobile terminal 200', and when the portable controlling device 100' for the home network is activated, the user interface application 250 may also be automatically executed while being synchronized with the first mobile terminal 200'.

The user moves the portable controlling device 100' for the home network connected to the first mobile terminal 200' close to the device 300' for the home network and then inputs instructions for approving pairing using the user interface application 250. The instructions for approving pairing transmitted from the user interface application 250 are transmitted to the controller 190 of the portable controlling device 100' for the home network. The controller 190 transmits the instructions to the first near communications module 110. When the user inputs the instructions for approving pairing through an input unit 330' of the device 300' for the home network, the first near communications module 110 and the second near communications module 310 are communication-connected to each other, and the device 300' for the home network is paired with the portable controlling device 100' for the home network. Once the portable controlling device 100' is paired with the device 300', the portable controlling device 100' may be separated from the first mobile terminal 200' and then mechanically/physically re-connected to the central unit 10. So, the user may remotely control the device 300 through the central unit 10 and/or the portable controlling device 10.

Figure 4:
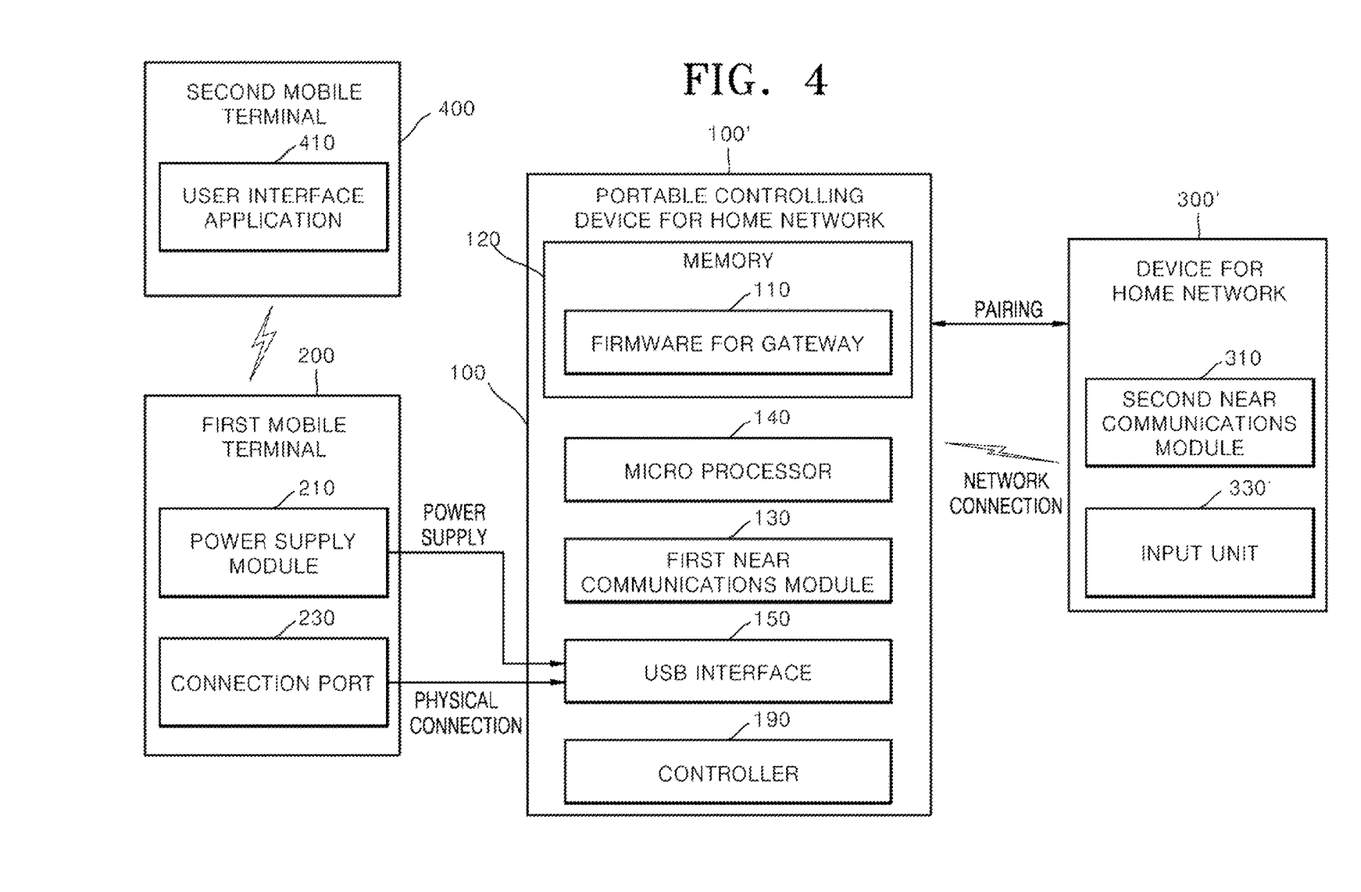
FIG. 4 is a block diagram illustrating an exemplary configuration of a home network system to which a method for using a portable controlling device for a home network according to a third embodiment is applied.

FIG. 4 illustrates a portable controlling device for a home network according to a third embodiment of the present invention and a structure in which pairing between the portable controlling device for the home network and a device for a home network is to be performed. Same reference numerals are used for the same configuration as that of the first and second embodiments described above, and detailed descriptions thereof will be omitted.

A first mobile terminal 200 having the same configuration as that of the first mobile terminal 200 according to the first embodiment does not include a user interface application. A portable controlling device 100' for a home network having the same configuration as that of the portable controlling device 100' for the home network according to the second embodiment does not include a first input unit.

In the third embodiment, the portable controlling device 100' for the home network further includes a second mobile terminal 400. Instructions for approving pairing of the portable controlling device 100' for the home network are input through the second mobile terminal 400. The second mobile terminal 400 may be a personal computer (PC) built in a house or office, another smart phone, or a smart pad, for example. However, the second mobile terminal 400 is not limited thereto, and various devices that are connectable to the first mobile terminal 100 via an external communications network may be used as the second mobile terminal 400.

A user interface application 410 which may input the instructions for approving pairing of the portable controlling device 100' for the home network, is installed at the second mobile terminal 400. The user interface application 410 installed at the second mobile terminal 400 may be provided from a provider who manufactures and sales the portable controlling device 100' for the home network.

The user inputs the instructions for approving pairing of the portable controlling device 100' for the home network by executing the user interface application 410 using the second mobile terminal 400. The instructions input using the second mobile terminal 400 are transmitted to the first mobile terminal 200 via the external communications network, and the first mobile terminal 200 transmits the instructions to the controller 190 of the portable controlling device 100' for the home network.

A structure in which pairing between the portable controlling device 100' for a home network according to the third embodiment and a device 300' for the home network is to be performed, will be described as follows. The user connects the USB interface 150 of the portable controlling device 100' for the home network to the connection port 230 of the first mobile terminal 200 and receives power of the portable controlling device 100' for the home network from the power supply module 210 of the first mobile terminal 200.

After moving the portable controlling device 100' for the home network connected to the first mobile terminal 200 close to the device 300' for the home network, the user inputs instructions for approving pairing of the portable controlling device 100' for the home network by executing the user interface application 410 of the second mobile terminal 400. The instructions input using the second mobile terminal 400 are transmitted to the first mobile terminal 200 via the external communications network, and the first mobile terminal 200 transmits the instructions to the controller 190 of the portable controlling device 100' for the home network. The controller 190 transmits the pairing approval instructions transmitted from the first mobile terminal 200 to the first near communications module 110.

When the instructions for approving pairing of the device 300' for the home network are input through an input unit 330' provided at the device 300' for the home network, the first near communications module 110 and the second near communications module 310 are communication-connected to each other, and the device 300' for the home network is paired with the portable controlling device 100' for the home network.

When the portable controlling device 100 or 100' is paired with the device 300 or 300' for the home network through the operations of the above-described embodiments, the portable controlling device 100 or 100' for the home network is mechanically/physically connected to the central unit 10 again and receives power from the central unit 10, and the device 300 or 300' for the home network may be controlled from the outside of the home network through the portable controlling device 100 or 100' for the home network.

As described in the above-embodiments, the portable controlling device 100, 100' operates in two operation modes, according to the execution of the firmware 110, by the micro-processor 140, contained in the memory 120. In a first operation mode, the portable controlling device 100, 100' is activated by electric power supplied from the central unit 10 that is connected to the external network outside the home network, and controls the device 300, 300' via the first wireless communications module. In a second operation mode, the portable controlling device 100, 100' is detached from the central unit 10 and is then activated by electric power supplied from the first mobile terminal 200, 200' which is physically connected with the portable controlling device 100, 100'. In this second operation mode, the portable controlling device 100, 100' is paired with the device 300, 300' via the first wireless communication module when the portable controlling device 300, 300 is within a predetermined distance from the device 300, 300'.

As described above, a method for using a portable controlling device for a home network according to the present invention has the following effects.

First, because a universal serial bus (USB) interface is provided in the portable controlling device for the home network, the portable controlling device for the home network is connected to a first mobile terminal so that power can be supplied to the portable controlling device for the home network from a power supply module of the first mobile terminal. Thus, no additional unit or device for supplying power to the portable controlling device for the home network is required so that portability is facilitated.

Second, because the portable controlling device for the home network that can be easily carried includes firmware for a gateway and a near communications module, a device for a home network is paired with the portable controlling device for the home network at a short distance from the device for the home network so that the portable controlling device for the home network can be connected to an external communications network using the firmware for the gateway of the portable controlling device for the home network. Thus, remote control of the device for the home network can be performed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for using a portable controlling device for a home network, the method comprising:
    activating the portable controlling device by electric power supplied from a first mobile terminal during a connection of the portable controlling device and the first mobile terminal, wherein the portable controlling device includes a first near communications module, a micro-processor, and a memory in which a firmware is programmed, wherein the portable controlling device is configured to act as a gateway with respect to a device for the home network by an execution of the firmware by the micro-processor;
    pairing the portable controlling device activated by the electric power supplied from the first mobile terminal with the device for the home network by wireless near communications, when the first mobile terminal and the device for the home network are located within a predetermined distance range for performing a pairing process by the wireless near communications;
    deactivating the portable controlling device after the portable controlling device is paired with the device for the home network, during a disconnection of the portable controlling device and the first mobile terminal;
    re-activating the portable controlling device paired with the device for the home network by electric power supplied from a central unit that is connected to a communications network, during a connection of the portable controlling device and the central unit; and
    remotely controlling the device for the home network via the reactivated portable controlling device using the firmware executed by the micro-processor and the first near communications module.

2. The method of claim 1, wherein the portable controlling device for the home network comprises a first input unit through which instructions for performing the pairing are input.

3. The method of claim 2, wherein the device for the home network comprises a second input unit through which instructions for performing the pairing are input.

4. The method of claim 3, wherein, when instructions for performing the pairing are input through each of the first input unit and the second input unit, the pairing is performed through the first near communications module.

5. The method of claim 1, wherein a user interface application for performing the pairing is installed at the first mobile terminal.

6. The method of claim 5, wherein the device for the home network comprises an input unit through which instructions for performing the pairing are input.

7. The method of claim 6, wherein, when instructions for performing the pairing are input through each of the user interface application and the input unit, the pairing is performed through the first near communications module.

8. The method of claim 1, wherein the first mobile terminal is connected to a second mobile terminal through a communications network, and a user interface application for performing the pairing is installed at the second mobile terminal.

9. The method of claim 8, wherein the device for the home network comprises an input unit through which instructions for performing the pairing are input.

10. The method of claim 9, wherein, when instructions for performing the pairing are input through each of the user interface application and the input unit, the instructions input through the user interface application are transmitted to the first mobile terminal through the communications network, and the pairing is performed through the near communications module.

11. The method of claim 1, wherein the central unit and the portable controlling device are configured to be connected with each other by a universal serial bus (USB) interface.

12. The method of claim 1, wherein the mobile terminal and the portable controlling device for the home network are configured to be connected with each other by a USB interface.

13. A method for using a portable controlling device for a home network, the method comprising:
    deactivating the portable controlling device including a first near communications module, a micro-processor, and a memory, by disconnecting electric power supplied from a central unit that is connected to a communications network, the memory including a firmware programmed therein and which, when being executed by the micro-processor, enables the portable controlling device to act as a gateway with respect to a device for the home network;
    activating the portable controlling device by electric power supplied from a first mobile terminal by connecting the portable controlling device to the first mobile terminal; and
    pairing the portable controlling device with the device for the home network by wireless near communications when the first mobile terminal and the device for the home network are located within a predetermined distance range for performing a pairing process by the wireless near communications.

14. The method of claim 13, further comprising, after the pairing is completed, deactivating the portable controlling device by disconnecting the electric power supplied from the first mobile terminal; and re-activating the portable controlling device by the electric power supplied from the central unit.

15. The method of claim 14, further comprising, after the re-activating the portable controlling device by the electric power supplied from the central unit, remotely controlling the device for the home network using the firmware and the first near communications module.

16. A portable controlling device for a home network including at least one device which is remotely controllable, the portable controlling device comprising:
    a micro-processor; and
    a memory in which a firmware is programmed, wherein the micro-processor is configured to execute the firmware to perform:
        a first operation mode where electric power is supplied to the portable controlling device from a central unit that is connected to an external network outside the home network, and the portable controlling device controls the at least one device via a first wireless communications module; and a second operation mode where the portable controlling device is detached from the central unit, electric power is supplied to the portable controlling device from a mobile terminal in a state that the portable controlling device and the mobile terminal are physically connected with each other, and the portable controlling device is paired with the at least one device via the first wireless communication module when the portable controlling device is within a predetermined distance from the at least one device, wherein the first operation mode is performed after the second operation mode is performed.

17. The device of claim 15, wherein the predetermined distance in the second operation mode is shorter than a distance between the portable controlling device and the at least one device in the first operation mode, wherein the micro-processor is configured to execute the firmware to determine whether the portable controlling device is within the predetermined distance from the at least one device when initiating a pairing process in the second operation mode.

18. The device of claim 15, wherein the central unit solely or in combination with the portable controlling device acts as a gateway connecting the at least one device to the external network outside the home network.

19. The device of claim 15, wherein the micro-processor is further configured to execute the firmware to determine whether the portable controlling device is within the predetermined distance from the at least one device in response to a connection of the portable controlling device and the mobile terminal.

20. The device of claim 15, wherein the mobile terminal includes a user interface application for controlling the at least one device on the mobile terminal, wherein a user interface is shown on a display of the mobile terminal in responsive to a connection of the portable controlling device and the mobile terminal.

* * * * *